Oct. 28, 1941.                E. MARTIN                 2,260,469
                       HYDRAULIC SYNCHRONIZER
                       Filed Feb. 18, 1938
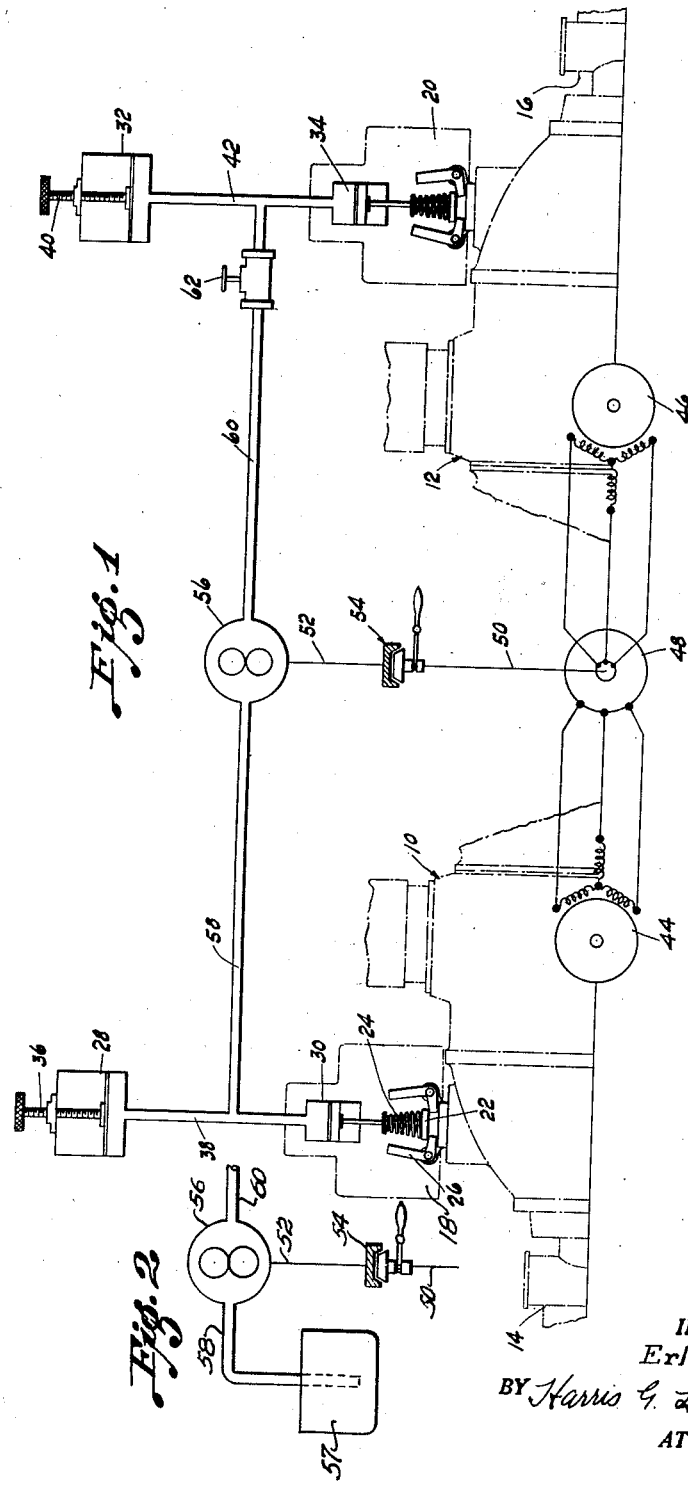
INVENTOR.
Erle Martin
BY Harris G. Luther
ATTORNEY Patented Oct. 28, 1941

2,260,469

UNITED STATES PATENT OFFICE 2,260,469

HYDRAULIC SYNCHRONIZER

Erle Martin, West Hartford, Conn., assignor to United Aircraft Corporation, East Hartford, Conn., a corporation of Delaware Application February 18, 1938, Serial No. 191,173

9 Claims. (Cl. 170—135.6)

This invention relates to an improved method and apparatus for synchronizing power plants and has particular reference to the synchronizing of power plants such as the engines of a multi-engine airplane, boat, locomotive or other vehicle.

An object of the invention resides in the provision in combination with means for manually or automatically controlling the speed of cooperating power plants, of means for automatically correcting such manually or automatically controlled speed to maintain the speed of each power plant substantially the same as each other power plant.

A further object resides in the provision of means for accurately comparing the speeds of two or more power plants and applying a correction to the speed of any power plant that is out of synchronism with a master control or reference speed device.

Other objects and advantages will become apparent as the description proceeds or will be more particularly pointed out hereinafter.

In the accompanying drawing in which like reference numerals are used to designate similar parts throughout, there is illustrated by way of example one manner of applying the improved method and a suitable apparatus therefor. The drawing, however, is for the purpose of illustration only and is not to be taken as limiting the scope of the invention as set forth in the appended claims.

Fig. 1 is a schematic diagram of an illustrative form of the improved synchronizing apparatus.

Fig. 2 is a fragmentary diagram of a modified form of the apparatus.

Referring to the drawing in detail the numerals 10 and 12 generally indicate two power plants, which have been illustrated by way of example, as fragmentary portions of the engines carried by a two engine airplane. Each engine drives a controllable pitch propeller, as indicated at 14 and 16 respectively, of a form well-known to the art, and which may be of the construction particularly illustrated and described in Patent No. 2,032,255 of February 25, 1936, by F. W. Caldwell for Propeller. The pitch of each of the controllable pitch propellers may be controlled by a suitable engine-driven centrifugal governor, as indicated at 18 and 20 respectively, which operate to control the pitch of the respective propellers to maintain the speed of the respective engine substantially constant at a selected or predetermined value. A suitable form of governor for this purpose is particularly illustrated and described in British Patent, Number 470,284, granted November 4, 1937, to E. E. Woodward for Automatic governor control for controllable pitch propeller. The pitch controlling mechanism of the propellers referred to are hydraulically actuated and, in such case, the governors would be arranged to actuate hydraulic valves controlling the supply of hydraulic fluid to the respective propeller pitch changing mechanisms and the drainage of the hydraulic fluid from the mechanisms. A suitable form of hydraulic valve for the purpose specified is also particularly illustrated and described in the Woodward patent referred to above and may constitute a slidable and rotatable stem member 22 actuated in one direction by a suitable resilient element such as the speeder spring 24 and in the other direction by the action of the centrifugally actuated fly weights 26. As the construction and operation of both governors is the same and is particularly illustrated and described in the Woodward patent referred to, it is thought that a brief description of the principal elements of only one of the governors is sufficient for the purpose of this disclosure. Preferably some suitable means is provided for adjusting the setting of each governor. In the arrangement illustrated, this means takes the form of a variable volume hydraulic chamber hydraulically connected with a second variable volume chamber operatively associated with the movable abutment of the speeder spring of the respective governor, and means for manually varying the volume of the first mentioned chamber. The chambers 28 and 30 are operatively associated with the abutment of the spring 24 of the governor 18, and the chambers 32 and 34 are likewise operatively associated with the movable abutment of the speeder spring of the governor 20. The chamber 28 is controlled by a suitable manually operable device such as the screw 36 and is connected to the chamber 30 by the conduit 38, while the chamber 32 may be controlled by a similar screw 40 and is connected to the chamber 34 by the conduit 42. With this arrangement the setting of the governor 18 may be adjusted by manually rotating the screw 36 in one direction or the other and the governor 20 may be similarly adjusted by manually rotating the screw 40, as is clearly obvious from the disclosure.

Each of the engines 10 and 12 drives an alternating current generator, as indicated at 44 and 46 respectively, and these generators are respectively connected to the two separately energized relatively rotatable portions of an electrical differential mechanism 48. The generators 44 and 46 are positively driven by the respective engines at engine speeds or at some multiple or fraction thereof and the action of the differential device 48 is such that one portion thereof rotates relatively to the other whenever the current supplied to the separate portions by the respective generators 44 and 46 is out of phase due to a difference in the speed of the engines 10 and 12. The differential mechanism may conveniently comprise a stator portion, which is illustrated as connected to the generator 44, and a rotor portion, illustrated as connected to the generator 46. The rotor portion is operatively connected through shafts 50 and 52 and a manually operable clutch, generally indicated at 54, with a suitable form of liquid pump, generally indicated at 56. The pump 56 is completely reversible in action and is connected at one side through the conduit 58 with the conduit 38, and at the other side through the conduit 60 with the conduit 42.

With this arrangement rotation of the rotor portion of the electrical differential device 48 will operate the pump in one direction or the other to move liquid from one of the conduits 38 or 42 to the other. This movement of the liquid will change the pressure of the liquid acting on the expansible chambers 30 and 34 to thereby change the setting of the respective governors 18 and 20. The arrangement is such that if the speed of the engine 10 tends to exceed the speed of the engine 12, the pump 56 will be actuated in a direction to reduce the pressure in the chamber 30 and simultaneously increase the pressure in the chamber 34. This decrease in pressure in the chamber 30 increases the effectiveness of the centrifugal fly weights 26 of the governor 18 which moves the governor valve to bring about an increase in the pitch of the propeller 14 to thereby increase the load on the engine 10 and reduce its speed. Simultaneously, the pressure in the chamber 34 decreases the effectiveness of the centrifugal fly weights of the governor 20 which results in a movement of the governor actuated valve to bring about a decrease in the pitch of the propeller 16 thereby decreasing the load on the engine 12 and increasing its speed. When the speed of the engine 12 tends to exceed that of the engine 10, the above described events will take place in the reversed order. The improved synchronizing apparatus thus acts to compare the speeds of the two engines and, when the speeds are different, to apply a corrective force to the constant speed control of both engines to bring the engine speed into synchronism at the speed selected by the manual control. Obviously an additional engine could be synchronized by a simple duplication of the portion of the synchronizing apparatus applicable to the individual engine.

One of the conduits 58 or 60, the conduit 60 as illustrated, may be provided with a suitable manually actuatable valve, as indicated at 62, to block, when closed, one side of the pump 56 to thereby render the synchronizing apparatus inoperative and subject the engines to the direct control of the respective manually operable control devices. When the valve 62 is closed, the clutch 54 may be simultaneously disengaged to relieve the apparatus from the strain of operating the pump 56 when blocked.

It is also within the scope of the invention to arrange the pump connections so that the pump adjusts only one governor to regulate the speed of the associated engine, the other engine operating in that case as a master engine to establish a reference speed. In such an arrangement one side of the pump would be connected to a suitable reservoir 57 to add hydraulic fluid to the control chamber of the respective governor or remove hydraulic fluid therefrom. Obviously as many engines as desired may be synchronized with the reference speed by providing a generator, an electrical differential, a hydraulic governor adjusting device, and a reversible pump for each controlled engine, connected with the reference speed driven generator in the manner indicated above.

While there has been illustrated and described one manner of applying the improved method and a suitable form of apparatus therefor, it is to be understood that such changes in both the method and apparatus may be resorted to as come within the scope of the appended claims.

Having now described the invention so that others skilled in the art may clearly understand the same, what it is desired to secure by Letters Patent is as follows:

1. Apparatus for synchronizing the propeller driving engines of a multi-engine aircraft comprising, a device associated with each engine responsive to hydraulic pressure to control the speed of the respective engine, a connection between the hydraulic speed controlling devices of two engines to be synchronized, a reversible pump in said connection, an electrical impulse generator driven by each of said two engines, an electrical differential device energized by said generators and having a portion movable in response to a phase difference in the generated current impulses, and means connecting said movable portion with said reversible pump to vary the adjustment of said speed controlling devices to correct a speed variation between said engines.

2. In combination with a plurality of jointly operating engines each provided with a speed controlling device, hydraulic means comprising an individual manually adjustable expansible chamber for each engine, means connecting each expansible chamber with the speed controlling device of the respective engine, and means responsive to differences in engine speed hydraulically connected with said expansible chambers, to shift hydraulic pressure from one chamber to another and thereby correct the adjustment of the various speed controlling devices to eliminate such speed differences.

3. In combination with a plurality of jointly operating engines each having a spring controlled centrifugally actuated speed governor, hydraulic means comprising an individual manually adjustable variable volume device operatively connected with each respective governor spring to change the setting of said governor, hydraulic means connecting said variable volume devices in associated pairs, a reversible pump in each of said connections operative to shift hydraulic pressure from one to the other of the variable volume devices of each pair, and speed difference responsive means operatively associated with the respective pair of engines and the respective pump to operate said pump in one direction or the other whenever said engines are out of speed synchronism with each other.

4. Means for controlling and synchronizing the speed of a pair of airplane engines each driving a controllable pitch propeller and equipped with a centrifugally actuated speed governor for controlling the pitch of the respective propeller to maintain the speed of the engine constant at a rate consistent with the governor setting comprising, an expansible chamber device on each governor for controlling the setting thereof, a manually adjustable variable volume device connected with each expansible chamber device to constitute a manual control unit for each governor, a hydraulic connection between said units, a reversible pump in said connection, and a speed difference responsive device actuated by a difference in the speed of said engine to drive said pump.

5. In combination, a plurality of speed controlling devices each having a hydraulically actuated adjusting means and being operatively associated with a respective rotating body to control the speed thereof, a reversible pump for shifting hydraulic fluid from one hydraulically actuated adjusting means to another to equalize the rotational speeds of said bodies, means connecting said pump with said adjusting means, and means responsive to a difference in the speed of said rotating bodies for actuating said pump.

6. Apparatus for synchronizing the speed of engines comprising, an engine speed control for each engine, a hydraulic adjusting device for each control, an electric current impulse generator driven by each engine, an electrical differential device electrically connected between the generators of two engines to be synchronized, said differential device having a portion rotatable at a speed and in a direction proportional to a difference in the speeds of the generator driving engines, a hydraulic connection between the hydraulic adjusting devices for the speed controls associated with said two engines, a reversible pump in said hydraulic connection, and an operative connection between said rotatable portion and said reversible pump.

7. Means for controlling and synchronizing the speed of a pair of airplane engines each driving a controllable pitch propeller and equipped with a centrifugally actuated speed governor for controlling the pitch of the respective propeller to maintain the speed of the engine constant at a rate consistent with the governor setting comprising, an expansible chamber device on each governor for controlling the setting thereof, a hydraulic connection between said devices, a reversible pump in said connection, and a speed difference responsive device actuated by a difference in the speed of said engines to drive said pump.

8. Means for synchronizing the speeds of a pair of engines comprising, means for controlling the speed of one engine, speed controlling means for the other engine, a variable volume hydraulic device connected with said speed controlling means for adjusting the same, a rotatable reversible pump hydraulically connected with said variable volume device for adjusting said speed controlling means, and means operably connected with each engine and rotatable at a speed directly proportional to the magnitude of the speed difference between said engines and in the same direction as said speed difference for driving said pump.

9. Means for synchronizing the speeds of a pair of engines comprising, means for controlling the speed of one engine, speed controlling means for the other engine, a variable volume hydraulic device connected with said speed controlling means for adjusting the same, a rotatable reversible pump hydraulically connected with said variable volume device for operating the same, means operably connected with each engine and rotatable at a speed directly proportional to the magnitude of the speed difference between said engines and in the same direction as said speed difference for driving said pump, and a manually adjustable expansion chamber connected with said variable volume device for manually adjusting said speed controlling means.

ERLE MARTIN.